United States Patent [19]
Kiefer et al.

[11] Patent Number: 5,575,606
[45] Date of Patent: Nov. 19, 1996

[54] WHEEL LIFT TOWING ATTACHMENT ASSEMBLY

[75] Inventors: John H. Kiefer, Fayetteville; Jeffrey S. Barbour, State Line, both of Pa.

[73] Assignee: Jerr-Dan Corporation, Greencastle, Pa.

[21] Appl. No.: 305,098

[22] Filed: Sep. 13, 1994

[51] Int. Cl.$^6$ ..................................................... B60P 3/12
[52] U.S. Cl. ........................................................ 414/563
[58] Field of Search ............................. 414/426–9, 563; 280/402

[56] References Cited

U.S. PATENT DOCUMENTS

| | | |
|---|---|---|
| 2,183,478 | 12/1937 | Holmes et al. . |
| 3,152,814 | 11/1961 | Wegener et al. . |
| 3,285,443 | 9/1964 | Gaumont . |
| 3,690,482 | 9/1972 | Gaumont . |
| 4,473,334 | 9/1984 | Brown . |
| 4,573,857 | 3/1986 | Porter, Sr. et al. . |
| 4,637,623 | 1/1987 | Bubik . |
| 4,679,978 | 7/1987 | Holmes et al. . |
| 4,737,066 | 4/1988 | Allison, Jr. . |
| 4,741,661 | 5/1988 | Carey . |
| 4,761,111 | 8/1988 | Brown . |
| 4,775,285 | 10/1988 | Zackovich . |
| 4,793,763 | 12/1988 | Bubik . |
| 4,798,509 | 1/1989 | Bubik . |
| 4,836,737 | 6/1989 | Holmes et al. . |
| 4,871,291 | 10/1989 | Moore et al. . |
| 4,875,822 | 10/1989 | Nespor . |
| 4,890,972 | 1/1990 | Nekola et al. . |
| 4,904,146 | 2/1990 | Lock et al. . |
| 4,927,315 | 5/1990 | Nespor . |
| 4,948,327 | 8/1990 | Crupi, Jr. ........................... 280/402 X |
| 4,958,980 | 9/1990 | Holmes et al. . |
| 4,968,052 | 11/1990 | Alm et al. . |
| 4,986,720 | 1/1991 | Holmes et al. . |
| 4,993,909 | 2/1991 | Hamman . |
| 5,012,209 | 5/1991 | DeMichele et al. . |
| 5,039,272 | 8/1991 | Holmes et al. . |
| 5,123,802 | 6/1992 | Bell . |
| 5,391,044 | 2/1995 | Young ..................................... 414/563 |

OTHER PUBLICATIONS

Challenger Wrecker Mfg., Inc., 4800 Series New Concept.
Century—Legendary Leadership, "We've just built a powerful new source of pride!".
Century, "We're taking it to the streets!".
Century—Fast, Efficient, Lightweight, safe.

*Primary Examiner*—James W. Keenan
*Attorney, Agent, or Firm*—McDermott, Will & Emery

[57] ABSTRACT

A wheel lift attachment assembly (10) of the type coupled to a towing vehicle (12) for supporting the wheels (11) of the vehicle to be lifted and towed by the towing vehicle (12) is disclosed. The wheel lift attachment assembly (10) comprises a cross beam (16) and first (26) and second (28) receivers coupled to the ends (18, 20) of the cross beam (16). The first and second receivers (26, 28) each have an upper plate (30) and a lower plate (32) parallel with the upper plate (30). The lower plate (32) is spaced vertically below and laterally offset from the upper plate (30). First and second wheel support arms (38, 40) are slidably received between the upper and lower plates (30, 32). A first pin (54) extends outwardly from each of the receivers (26, 28) and is positioned vertically below the upper plate (30) and substantially level with the lower plate (32) to prevent the wheel support arms (38, 40) from vertically tilting away from the upper and lower plates (30, 32).

28 Claims, 6 Drawing Sheets

WHEEL LIFT TOWING ATTACHMENT ASSEMBLY

TECHNICAL FIELD

This invention relates to wheel lift attachment assemblies of the type coupled to a towing vehicle for supporting the wheels of a vehicle to be lifted and towed by the towing vehicle.

BACKGROUND OF THE INVENTION

In recent years, manufacturers have redesigned tow trucks and associated attachment apparatus used to tow vehicles. Now, instead of towing a vehicle by its frame and bumper, a vehicle is towed by its wheels. Such assemblies are generally referred to as wheel lift towing attachment assemblies because the assembly lifts a vehicle by its wheels rather than by the vehicles body structure.

An example of a wheel lift towing device can be found in U.S. Pat. No. 4,637,623 issued to Bubik on Jan. 20, 1987. The '623 Bubik patent discloses a wheel lift attachment assembly having a telescoping boom extending rearwardly from a tow truck chassis. The boom fixedly positions a support structure having a transverse wheel support beam below the vehicle to be towed. Two wheel support members are mounted adjacent to opposite ends of the support beam and include a elongated arm extending generally transverse to the axis of the support beam and a wheel retainer mounted on the end of the arm. Pivotal collars are pivotably mounted atop of the support beams and adjacent to the opposing ends thereof. The collars provide horizontal and vertical movement relative to the fixed support beam for positioning the wheel support members for receiving the wheels of the vehicle to be towed. The pivotal collars as disclosed in the '623 Bubik patent have a tapered passageway for slidably receiving the wheel support members. The tapered passageway allows the wheel support members to be vertically disposed relative to the support beam; that is, tilted within the tapered passageway. A pin extends vertically upward from the collar into the tapered passageway for engaging the wheel support members to prevent the wheel support members from sliding horizontally within the passageway. A second pin is provided for engaging the wheel support members to prevent the wheel support members from vertically tilting within the passageway. The wheel support members are tiltible between a first position wherein the first pin engages the wheel support members to prevent the wheel support members from sliding horizontally within the tapered passageway, and a second position wherein the wheel support members are free to slide horizontally within the tapered passageway.

The '623 Bubik patent does not disclose a collar having an upper plate and lower plate spaced vertically below and laterally offset from the upper plate wherein the upper and lower plates form a channel having a constant vertical dimension (i.e. not tapered) within which the wheel support members can slide horizontally and tilt vertically. Also, the '623 Bubik patent does not disclose collars positioned at the ends of the support beam such that the wheel support member lies below the top of the support beam when in use. Instead, the Bubik '623 patent discloses a collar which is positioned on top of the top of the support beam and thus the wheel support members lie above the top of the support beams when in use. Finally, the '623 Bubik patent does not disclose a pin to be used in conjunction with the upper and lower plates wherein the pin is positioned vertically below the upper plate and parallel with the lower plate. A pin positioned in such a manner prevents the wheel support arm from vertically tilting away from the upper and lower plates without extending through or into the support arm. Thus, the wheel support arm is positioned between the pin and the upper plate.

An advertisement published by Century® discloses a wheel lift attachment assembly comprising a support beam having wheel abutments telescopingly coupled to each end of the beam. The advertisement also discloses L-shaped wheel support arms coupled to the end of the wheel abutments by means of a collar. The collar is rotatably coupled to the ends of the wheel abutments to provide horizontal rotation of the support arms relative to the ends of the wheel abutments. The collar includes an upper plate and a lower plate spaced vertically below and laterally offset from the upper plate to form a channel having a constant dimensional shape for slidably receiving the support arms. The collar allows horizontal positioning of the support arms with respect to the support beam and vertical positioning between the plates. In other words, the support arms can be both vertically tilted and horizontally slid within the channel formed by the upper and lower plates in addition to the horizontal rotation about the ends of the wheel abutments. The Century® advertisement discloses a single pin extending from the collar which extends through one side of the support arm to prevent the arm from being horizontally slid and vertically tilted within the channel. Additionally, the upper plate of the rotatable collar lies in a plane above the top surface of the support beam such that nearly all of the support arm lies above the top of the support beam when the support arm is disposed between the upper and lower plates and parallel therewith.

SUMMARY OF THE INVENTION AND ADVANTAGES

The present invention is a wheel lift attachment assembly of the type coupled to a towing vehicle for supporting the wheels of a vehicle to be lifted and towed by the towing vehicle. The assembly comprises a cross beam adapted to be coupled to the towing vehicle. The cross beam has a first end and a second end. The assembly also comprises first and second receivers coupled to the respective first and second ends of the cross beam wherein the first and second receivers each have an upper plate and a lower plate parallel with the upper plate. The lower plate is spaced vertically below and laterally offset from the upper plate. The assembly further comprises first and second wheel support arms slidably received between the upper and lower plates of the respective receivers, wherein the first and second wheel support arms each have a wheel cradle member extending from one end thereof for engaging the wheels of the vehicle to be towed so that the wheels of the vehicle to be towed are cradled between the cross beam and the wheel cradle members. The assembly is characterized by a first pin extending outwardly from each of the receivers and positioned vertically below the respective upper plate and parallel or substantially level with the respective lower plate for preventing the respective wheel support arm from vertically tilting away form the respective upper and lower plates.

The primary object and advantage of the present invention is the provision of a means for independently controlling the vertical tilting and horizontal sliding of the wheel support arms relative to receivers having an upper plate and a lower plate spaced vertically below and laterally offset from the upper plate, wherein the vertical tilting is controlled by a pin which is positioned to abut the support arms. This provision provides the advantage of easier operation by the user. With this provision, the user avoids having to align a pin for insertion into apertures formed in the support arms. This alignment process is especially disadvantageous in cold weather climates where ice build up tends to plug-up the apertures in the support arms. Users must then remove the ice build-up in and around the apertures before insertion of the pin.

Another object and advantage of the present invention is the provision of receivers for receiving support arms which are positioned horizontally across from the ends of the cross beam so that the support arms disposed therein are across from the cross beam instead of above the cross beam as in the prior art. This design provision allows the support arms to be positioned closer to the road surface upon which the wheels to be lifted rest. This in turn allows the support arms to clear a body of a car positioned close to the surface to the road.

FIGURES IN THE DRAWINGS

DESCRIPTION TO THE PREFERRED EMBODIMENT

Figure 1:
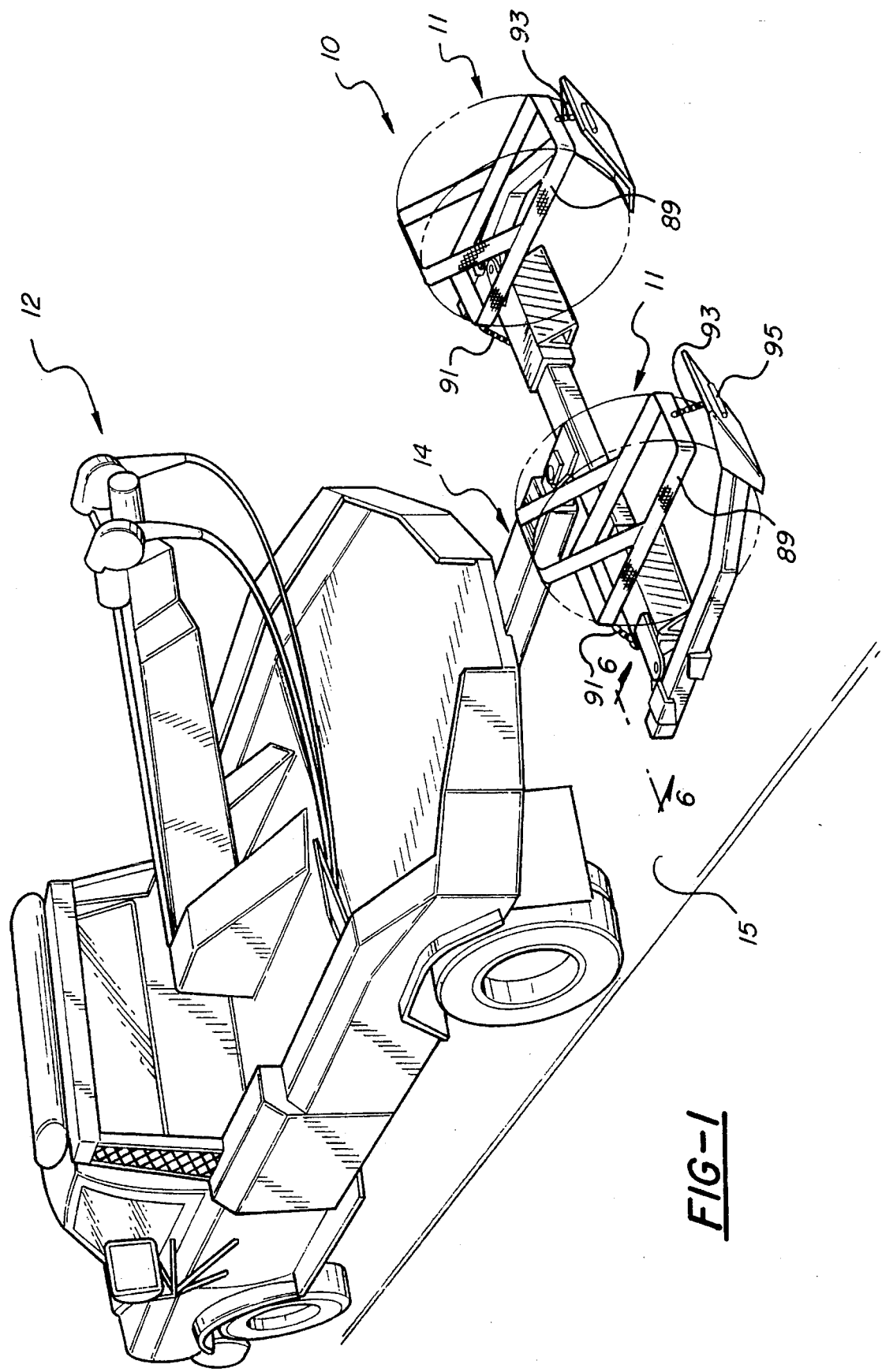
FIG. 1 is a perspective view of the present invention within its environment.

Referring to FIG. 1, the wheel lift attachment assembly 10 of the present invention is shown coupled to a towing vehicle 12. The wheel lift attachment assembly 10 supports vehicle wheels 11 (shown in phantom in FIG. 1 and shown partially in FIG. 2). The wheel lift attachment assembly 10 is used to lift the wheels 11 of a vehicle (not shown) from a road surface 15 upon which they rest. The wheel lift attachment assembly 10 is rotatably coupled to a boom 14 which extends rearwardly from the chassis of the tow vehicle 12. The boom 14 can be moved vertically relative to the road surface 15 from a raised position above the road surface 15 to a lowered position flush with the road surface 15. The boom 14 can be hydraulically controlled with a boom system such as that disclosed in U. S. Pat. No. 4,637,623, the specification and its teachings of which are incorporated herein by reference. In the lowered position, the wheel lift attachment assembly can be set up to cradle the wheels 11 so that the wheels 11 of the vehicle can be lifted upwardly from the surface 15 upon which they rest when the boom 14 is raised to the raised position. Thus, either the front or the rear of a vehicle having four wheels, two of which are in the front and two of which are in the rear can be lifted and towed.

Figure 3:
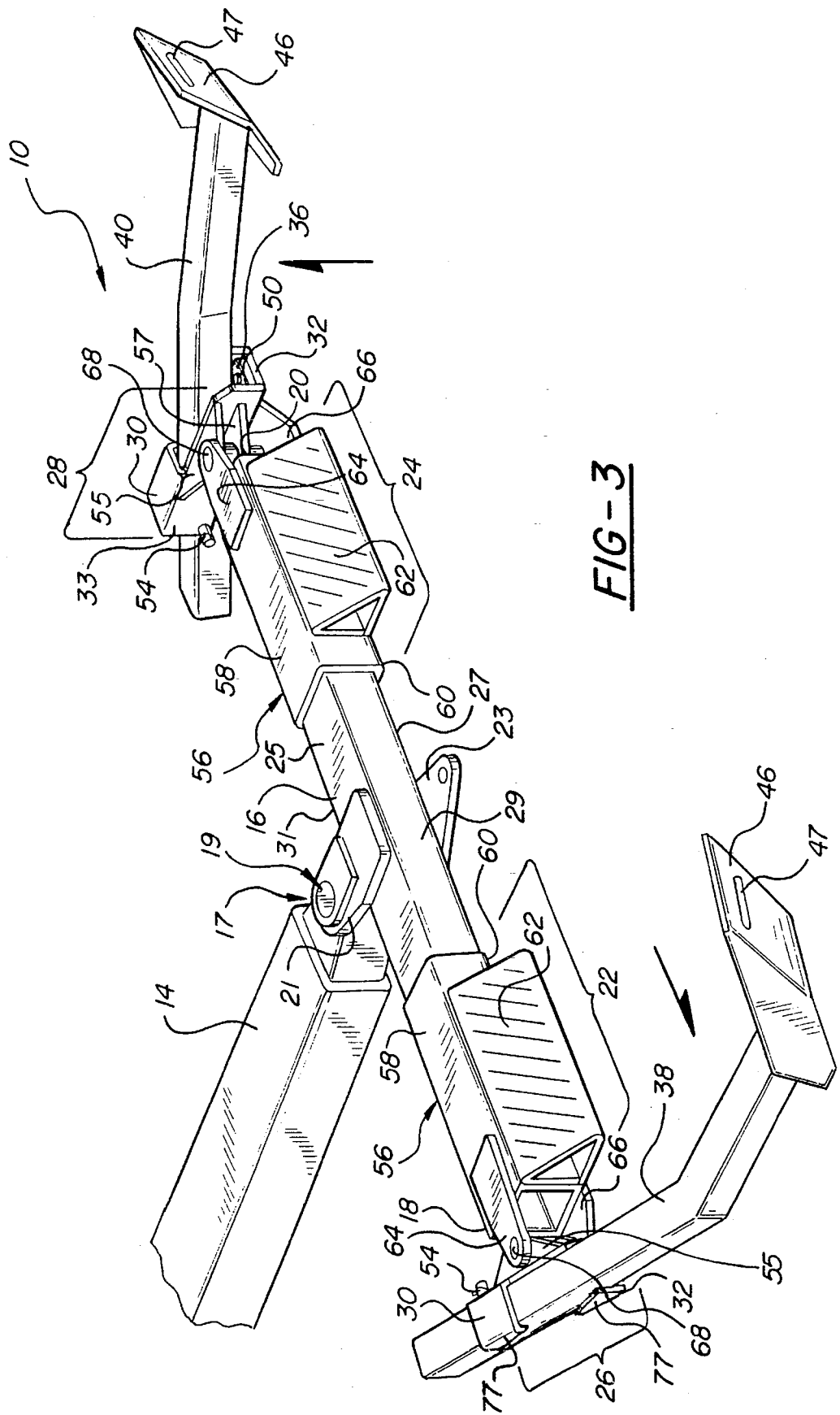
FIG. 3 is a perspective close-up view of the present invention.

Referring to FIG. 3, the wheel lift attachment assembly 10 comprises a cross beam 16 rotatably coupled to the boom 14. The cross beam 16 is rotatably coupled to the distal end 17 of the boom 14 by cylindrical member 19. The cylindrical member 19 extends through the distal end 17 of the boom 14 and is fixed between a first upper support member 21 and a second lower support member 23 which extend outwardly from cross beam 16 toward the distal end 17 of the boom 14. The cross beam 16 is rectangularly shaped and includes first and second wheel abutments 22, 24 having respective ends 18, 20. The cross beam 16 comprises a top side 25, a bottom side 27 parallel to the top side 25 and two parallel sides 29 and 31. The first and second wheel abutments 22, 24 are telescopingly coupled to the cross beam 16. In other words, the first and second wheel abutments 22 and 24 can slide on the beam 16 inwardly or outwardly from the boom 14 thereby either increasing or decreasing the distance between the ends 18, 20 and the boom 14. This telescoping feature of the wheel abutments 22, 24 accounts for varying distances between the wheels 11 of the vehicle to be towed. First and second wheel abutments 22, 24 each include a hollow rectangular portion 56 having top and bottom sides 58, 60, a hollow triangular portion 62 attached to the rectangular portion 56, an upper ledge 64 extending outwardly from the top side 58 of the rectangular portion 56 and a bottom or lower ledge 66 extending outwardly from the bottom side 60 of the rectangular portion 56.

Figure 6:
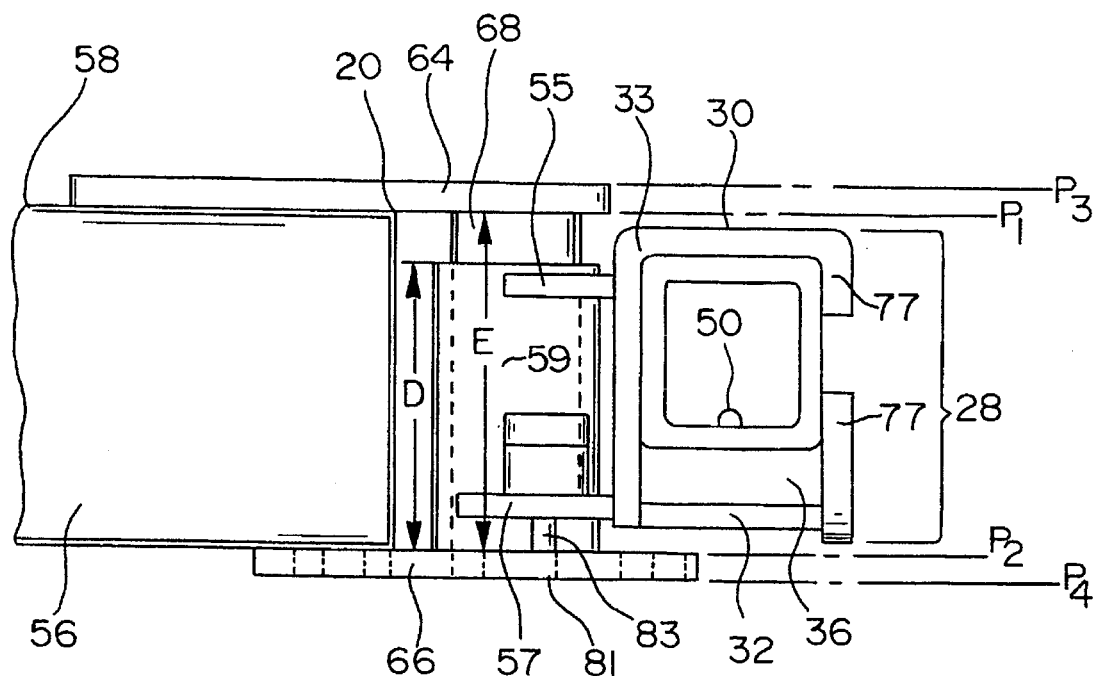
FIG. 6 is a cross sectional view taken about line 6—6 in FIG. 4 showing the tubular sleeve resting on the lower ledge and the third pin extending in an aperture therein for preventing rotation of the receiver.
Figure 7:
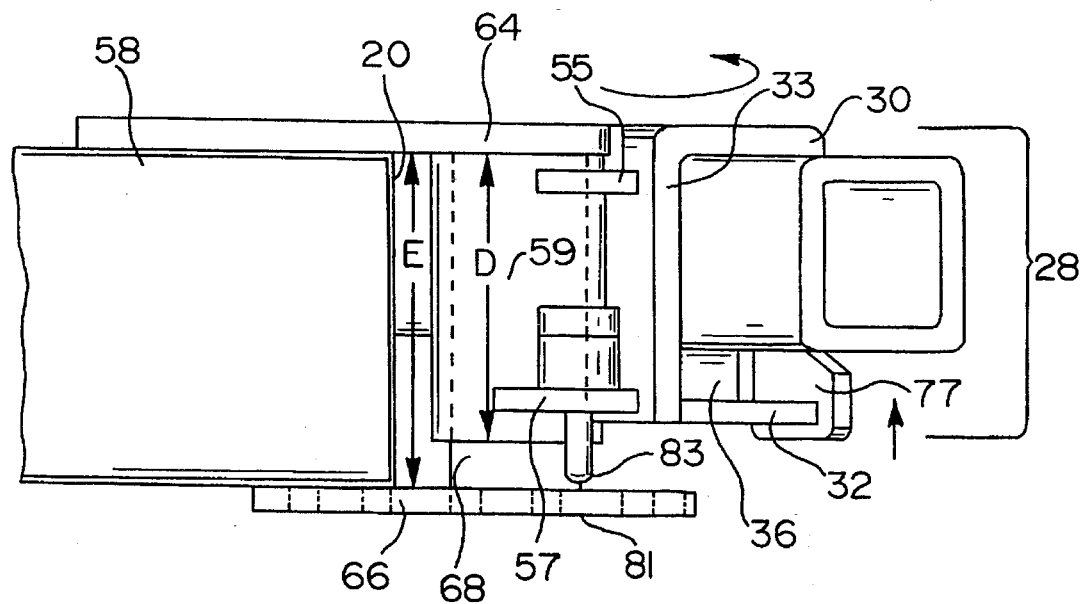
FIG. 7 is a cross sectional view taken about lines 6—6 in FIG. 4 wherein the tubular sleeve and third pin have been lifted from the lower ledge such that the third pin is removed from the aperture therein thereby allowing the receiver to rotate about the dowel as shown.

The wheel lift attachment assembly 10 also comprises a first receiver 26 and a second receiver 28 coupled to the respective first 18 and second 20 ends of the first and second wheel abutments 22, 24 of the cross beam 16. The first 26 and second 28 receivers each have an upper plate 30 and a lower plate 32 spaced vertically below and laterally offset from the upper plate 30. The lower plate 32 includes a raised ridge portion 36. The raised ridge portion 36 is U-shaped as shown best in FIG. 2, in hidden. The raised ridge portion 36 includes a top surface 37 parallel to the lower plate 32. Upper plate 30 is parallel to lower plate 32 and defines a channel 34 occupying a space between the upper plate 30 and top surface 37 of the raised ridge portion 36 of the lower plate 32. Each receiver 26, 28 includes a wall portion 33 for holding the upper and lower plates 30, 32 in the spaced and laterally offset arrangement described above. The wall portion 33 is perpendicular to the upper and lower plates 30, 32 and extends therebetween. Each receiver 26, 28 also includes an upper 55 and lower 57 sleeve support extending perpendicularly from the wall portion 33. The upper sleeve support 55 is positioned vertically above the lower sleeve support 57 and is parallel therewith. Each receiver 26, 28 also includes a tubular sleeve 59 as best seen in FIGS. 6 and 7. Tubular sleeves 59 have a predetermined length D and are attached to the upper 55 and lower 57 sleeve supports in an upright position.

A cylindrical dowel 68 has a length E greater than the predetermined length D of the tubular sleeve 59. The dowel 68 is fixed between the upper 64 and lower 66 ledges and extends through the hollow tubular sleeve 59 thereby allowing the receivers 26, 28 to rotate about the dowel 68 and around the first 18 and second 20 ends of the cross beam 16.

The tubular sleeves 59 of the receivers 26, 28 can slide vertically between upper ledge 64 and the lower ledge 66.

The wheel lift attachment assembly further comprises first 38 and second 40 wheel support arms slidably supported between the upper and lower plates 30, 32 and in the channel 34 created thereby. Each wheel support arm 38, 40 includes a first rectangular portion 63 and a second rectangular portion 65, as seen best in FIG. 8. The second rectangular portion 65 is angled slightly with respect to the first rectangular portion 63. The support arms 38, 40 also each comprise a wheel cradle member 46 extending from the second rectangular portion 65. Each wheel support arm 38, 40 is supported between the upper and lower plates 30, 32 such that the wheel cradle member 46 is parallelly aligned with the triangular portion 62 of each respective wheel abutment 22, 24. The cradle members 46 include wheel strap aperture 47 therein. When each receiver 26, 28 is rotated such that the first rectangular portions of each respective wheel support arms 38, 40 are perpendicular to the crossbeam, the wheels 11 of the vehicle to be towed can be cradled between wheel cradle member 46 and first and second wheel abutments 22, 24, as shown in FIG. 2.

Figure 5A:
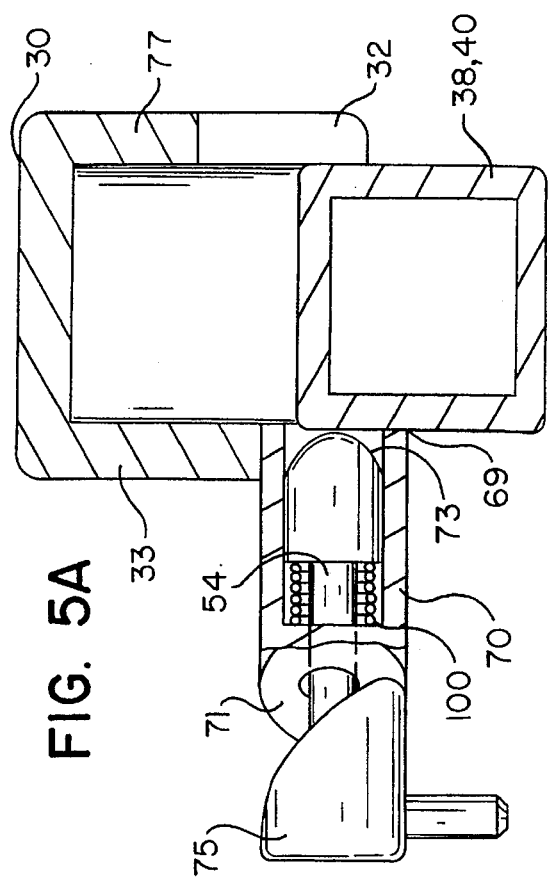
FIG. 5A is a cross sectional view taken about line 5A—5A of FIG. 4 showing the first pin of the present invention in its retracted position and the support arm tilted away from the upper plate.
Figure 5B:
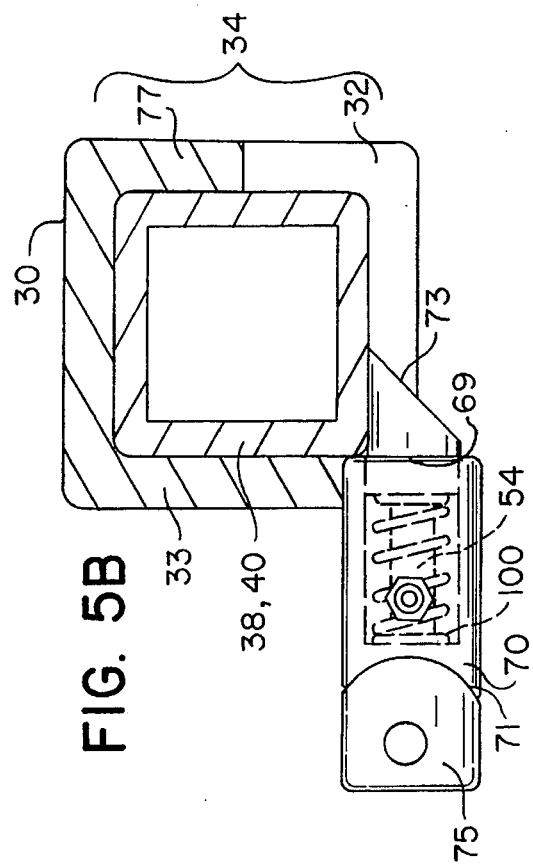
FIG. 5B is a cross sectional view taken along line 5B—5B of FIG. 4, showing the first pin of the present invention in its fully extended position and the support arm locked between the upper plate and the first pin.
Figure 4:
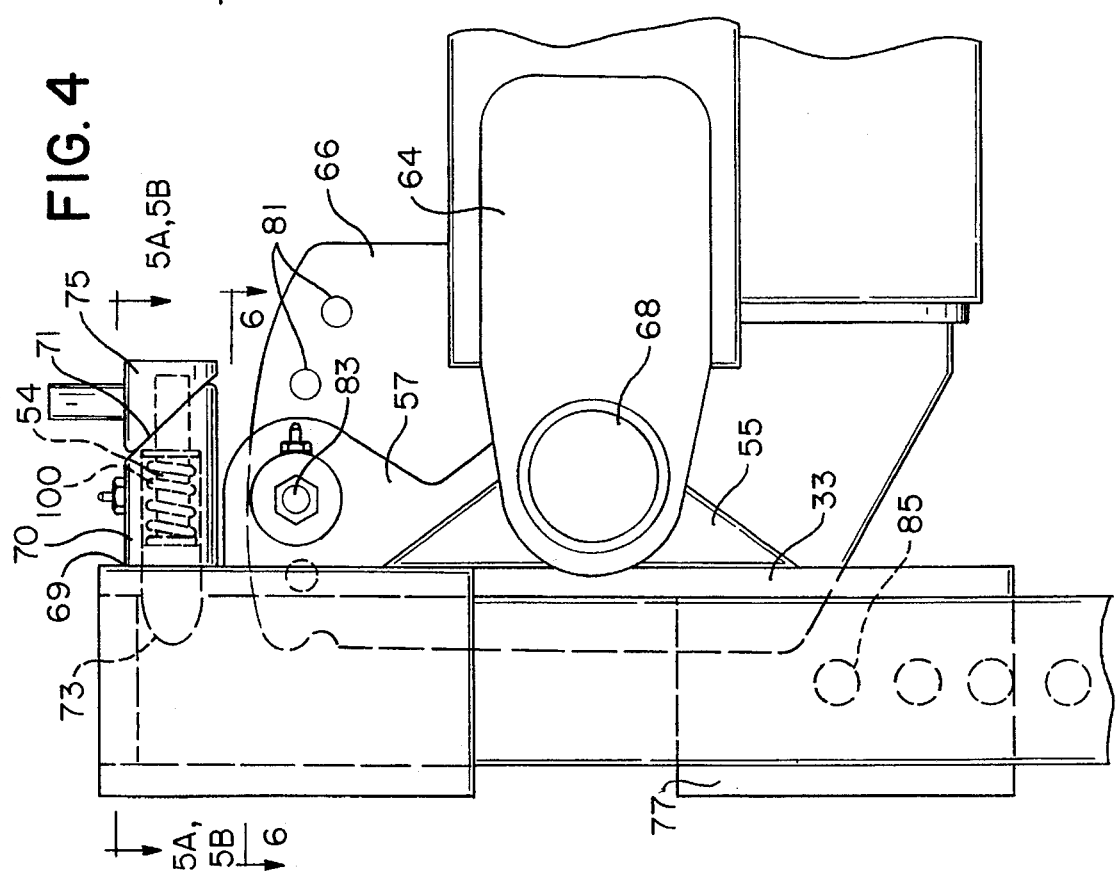
FIG. 4 is a top view of the receiver portion of the present invention.

The assembly 10 is characterized by a first pin 54 extending outwardly from each wall portion 33 of the receivers 26, 28. First pins 54 are positioned vertically below the upper plate 30 and parallel or substantially level with the lower plate 32 for preventing the wheel support arms 38, 40 from vertically tilting away from the upper and lower plates 30, 32 when positioned therebetween. The first pins 54 are movable between a first locked position, shown in FIG. 5B, wherein the support arms 38, 40 are locked between the upper plate 30 and the first pin 54 and a second unlocked position, shown in FIG. 5A, wherein the support arms 38, 40 are free to tilt vertically away from the upper and lower plates 30, 32 and out of the channel 34. The first pins 54 are slidably disposed within a hollow member 70, as shown best in FIGS. 4–5B. The hollow member 70 has a flat end 69 fixedly secured to the wall portion 33 of each receiver 26, 28. The hollow member 70 also includes a chamfered end 71. The first pins 54 have a wedged end 73 and an enlarged end 75 chamfered to engage the chamfered end 71 of the hollow member 70 such that rotation of the first pins 54 within the hollow member 70 causes the chamfered end 71 of the hollow member 70 to coact with the enlarged end 75 to move the first pins 54 between the first locked position and the second unlocked position. A spring 100 is disposed within the hollow member 70 for biasing the first pins 54 to the first locked position, as shown in FIG. 5B.

Figure 2:
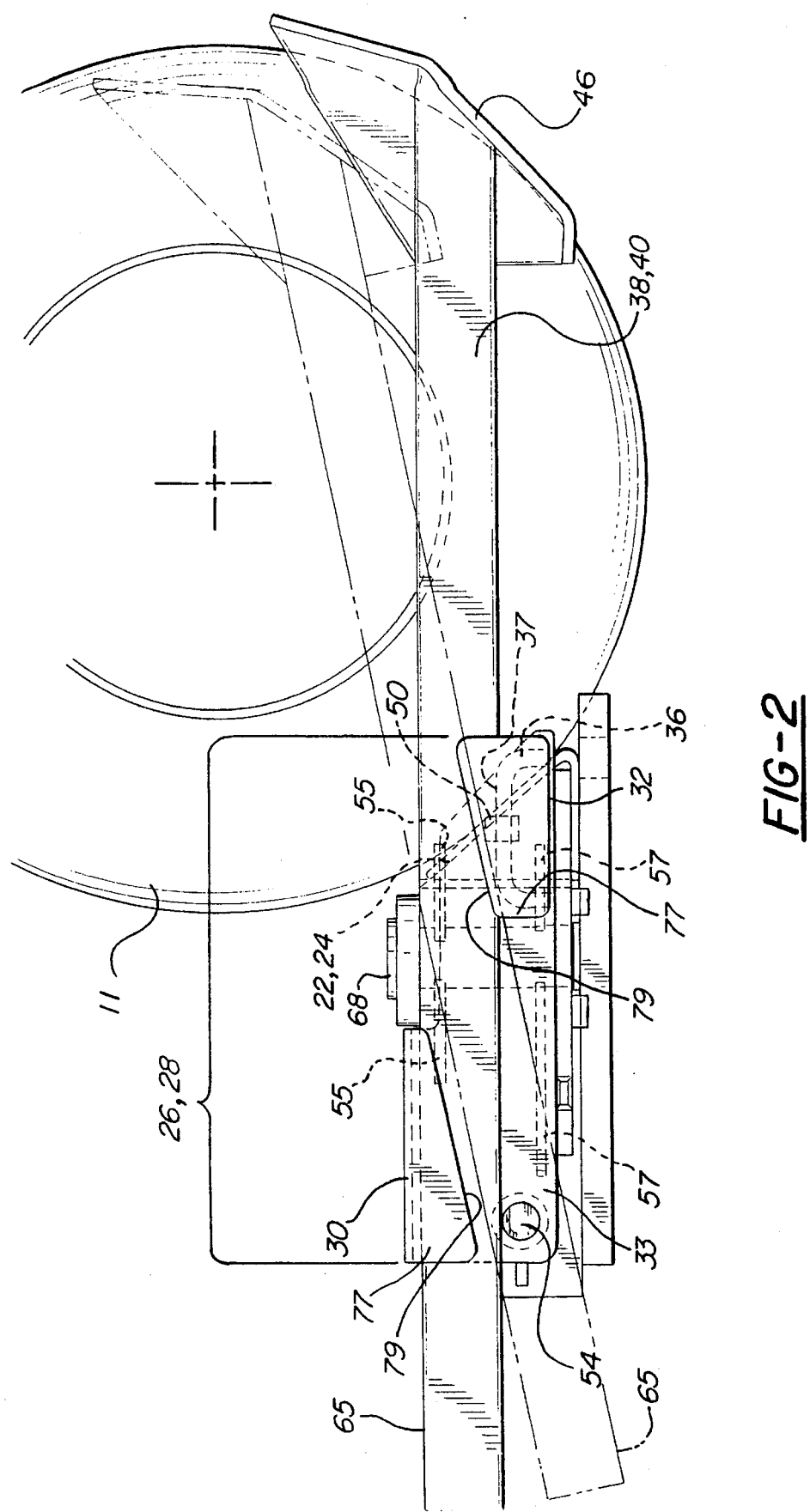
FIG. 2 is a side view of the present invention.

A second pin 50, shown in FIGS. 2, 3, and 6, extends vertically upwardly from the surface 37 of the raised ridge portion 36 of the lower plate 32. The second pins 50 extend in to each respective support arm 38, 40 for engagement therewith to prevent sliding horizontal movement of the support arms 38, 40 relative to the upper and lower plates 30, 32. As shown best in FIG. 2, support arms 38, 40 tilt vertically between a first position shown in non-phantom, wherein the second pin 50 engages with the support arms 38, 40 to prevent sliding horizontal movement of the support arms 38, 40 relative to the upper and lower plates 30, 32 and a second position shown in phantom wherein the support arms 38, 40 are free to slide horizontally relative to the upper and lower plates 30, 32. Again as shown in phantom in FIG. 2, the support arms 38, 40 are brought out of engagement with the fixed pin 50.

The upper and lower plates 30, 32 each include a side wall member 100 extending perpendicularly therefrom and parallel to the wall portion 33 of the receivers 26, 28. The side wall members 70 limit horizontal movement of the support arms 38, 40 relative to the wall portion 33 of the receivers 26, 28. The sidewall members 77 each include a slanted side 79, shown best in FIG. 2. When the support arms 38, 40 are positioned between the upper and lower plates 30, 32, sidewall members 77, wall portions 33 and first pins 54, the support arms 38, 40 are limited to horizontal rotation about dowel 68 and around respective ends 18, 20 of the cross beam 16. The lower ledge 66 includes at least one aperture 81 therein and each lower sleeve support 57 has a third pin 83 extending therefrom for engagement within the aperture 81 to prevent the receivers 38, 40 from rotating about the dowel 68. The third pin 83 is fixed to the lower sleeve support 57 such that the tubular sleeve 59 must be vertically slid upward along the dowel 68 toward the upper ledge 64 to withdraw the pin 83 from the aperture 81 in the lower ledge 66, as shown in FIG. 7. With the tubular sleeve 59 in this position and the pin 83 withdrawn from the aperture 81, the receivers 26, 28 and the respective support arms 38, 40 are free to rotate about the cylindrical dowel 68 until the tubular sleeve is allowed to rest upon the lower ledge 66 and the third pin again engages an aperture 81 therein, as shown best in FIG. 6. As shown best in FIG. 4, the plurality of apertures 81 are provided in the lower ledge 66 for providing discrete or incremental points of horizontal rotation of the wheel support arms 38, 40 positioned within the receivers 26, 28. The support arms 38, 40 also include a plurality of holes 85 therein, as seen best in FIG. 4, for receiving the second pin 50 and for providing discrete or incremental points of horizontal adjustment of the support arms 38, 40 relative to the support plates 30, 32.

The assembly 10 is also characterized by the receivers 26, 28 being positioned horizontally across from the respective ends 18, 20 of the cross beam 16 such that the upper and lower plates 30, 32 are positioned horizontally between the top 58 and bottom 60 of the wheel abutments 22, 24. Thus, when the first rectangular portion 66 of each respective support arm 38, 40 is disposed between upper plate 30, lower plate 32, side wall member 77 and first pin 54, the first rectangular portion 63 lies between a first plane P1 (see FIG. 6) defined by the top 58 and a second plane P2 (see FIG. 6) defined by bottom 60. In other words, the top 58 lies in the first plane P1 and the bottom 60 lies in the second plane P2 and the upper 30 and lower 32 plates are positioned such that the support arms 38, 40 are disposed between the first and second planes P1, P2. The top surface of upper ledges (64) define plane P3 and the lower surface of bottom ledges (66) define plane P4. The cross beam 16 which includes first and second wheel abutments 22, 24 lies between plane P3 and plane P4. The upper and lower plates 30, 32 are positioned to lie between plane P3 and plane P4.

In operation, the wheel abutments 22, 24 are positioned to abut the wheels 11 of the vehicle to be towed. The support arms 38, 40 are then placed between the slanted sides 79 of the side wall members 100 such that the support arms 38, 40 are positioned against the wall portion 33 of the receivers 26, 28. The support arms 38, 40 are tilted vertically relative to the upper and lower plates 30, 32 to place the support arms 38,40 between the slanted sides 79 of the sidewall members 77 so that the first portion 65 of the support arms 38, 40 are positioned below the first pin 54 (see FIGS. 2 and 5A). The second portion 65 of the support arms 38, 40 are then moved vertically downwardly such that the second pin 50 engages one of the apertures 85 in the first portion 63 of the support arms 38, 40. As the first portion 63 of the support arms 38, 40 are brought towards the upper plate 30, the first portion 63 of the support arms 38, 40 engage the wedged portion 73 of the first pin 54 thereby forcing first pin 54 into the second unlocked position and against the bias of spring 100. As soon as the first portion 63 of the support arms 38, 40 abut the upper plates 30, the first pin 54 snaps back into the locked position below the first portion 63 of the support arms 38, 40 by force of the spring 100. In this position, the first pin 54 abuts against the first portion 63. While in this position, the support arms 38, 40 can be used to slide the tubular sleeve 59 along the dowel 68 toward the upper ledge 64 so that the third pin 83 is brought out of engagement with the aperture 81 on the lower ledge 66 to thereby allow the respective receivers 26, 28 and respective support arms 38, 40 to rotate thereabout. The wheel cradle member 46 can then be horizontally rotated about the dowel 68 such that the wheels 11 of vehicle to be towed lie between wheel cradle members 46 and the triangular portions 62 of the wheel abutments 22, 24. The wheel cradle members 46 can then be vertically slid to abut against the wheels 11 by first moving the first pins 54 to the unlocked position, lifting the support arms 38, 40 out of engagement with the second pins 50 and then sliding the first portions 63 of the arms 38, 40 between the upper plate 30 and the lower plate 32. When the cradle members 46 are positioned to abut against the wheels 11, the support arms 38, 40 are dropped such that the second pins 50 engage one of the apertures 85 in the first rectangular portions 63 and the first pins 54 return to the first locked position.

Figure 8:
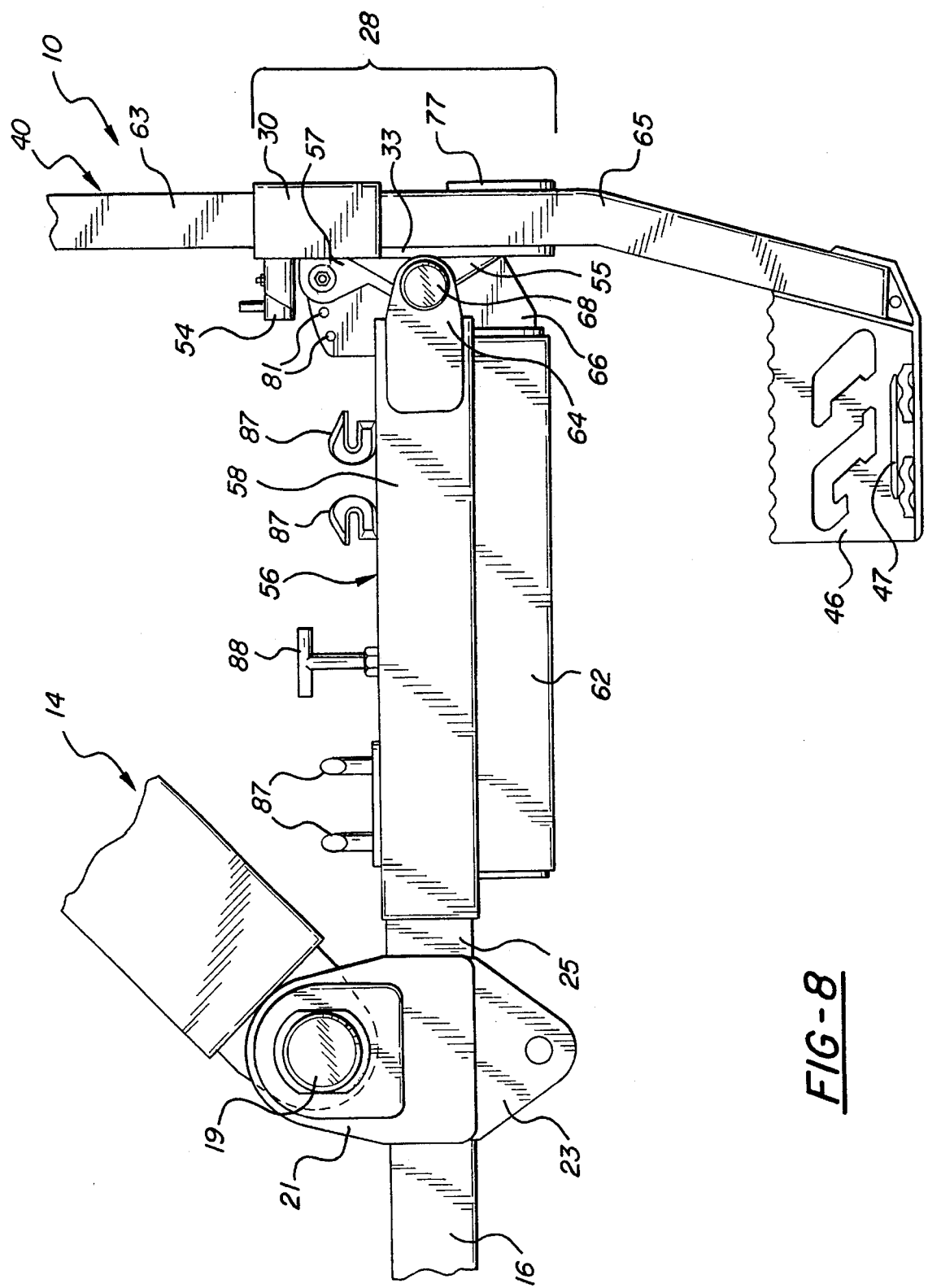
FIG. 8 is a partial top view of the present invention.

As seen best in FIG. 8, the wheel abutments 22, 24 include hooks 87 and a T-bar lock 88 for locking the telescoping wheel abutments 22, 24 to the cross beam 16. Referring to FIG. 1, wheel tire straps 89 having a first chain 91 and a second chain 93 are provided for strapping the wheels 11 to the wheel abutments 22, 24 and the wheel cradle members 46. As is shown in FIG. 1, first chain 91 is attached to hooks 87. The second chain 93 has a T-bar 95 at one end thereof which can be inserted within wheel cradle apertures 47 to lock the second chain 93 to the wheel cradle members 46.

The invention has been described in an illustrative manner, and it is to be understood that the terminology which has been used is intended to be in the nature of words of description rather that of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A wheel lift attachment of the type coupled to a towing vehicle for supporting the wheels of a vehicle to be lifted and towed by the towing vehicle, said assembly comprising:

a cross beam adapted to be coupled to the towing vehicle, said cross beam having a first end and a second end;

first and second receivers coupled to said respective first and second ends of said cross beam, said first and second receivers comprising an upper plate and a lower plate that are parallel, said lower plate being spaced vertically below and horizontally offset from said upper plate, first and second wheel support arms slidably received between said upper and lower plates of said respective first and second receivers, and a first pin extending outwardly from each of said receivers and positioned vertically below said respective upper plate such that at least a majority of the first pin is below a plane formed by an upper surface of said respective lower plate for preventing said respective wheel support arm from vertically tilting away from said respective upper and lower plates.

2. The assembly of claim 1 wherein each said upper plate and said lower plate have a sidewall member perpendicular thereto for limiting horizontal movement of said support arms relative to said receivers.

3. The assembly of claim 2 wherein each said sidewall member has a slanted side.

4. The assembly of claim 1 wherein each said receiver further includes an upper and a lower sleeve support extending therefrom, and wherein said upper sleeve support is positioned vertically above said lower sleeve support and parallel therewith.

5. The assembly of claim 4 wherein each said receiver further includes a tubular sleeve having a predetermined length and attached to said upper and lower sleeve supports.

6. The assembly of claim 1 wherein each said first pin is movable between a first locked position wherein the respective support arm is locked between the respective upper plate and the respective first pin and a second unlocked position wherein the respective support arm is free to tilt vertically away from the respective upper and lower plates.

7. The assembly of claim 6 wherein each of the first pins are slidably disposed within a hollow member having a flat end fixedly secured to the respective receiver and a chamfered end, each of the first pins having a wedged end and an enlarged end chamfered to engage said chamfered end of the hollow member such that rotation of each of the first pins within the hollow member causes said chamfered end of the hollow member to coact with said enlarged end to move each of the first pins between said first locked position and said second unlocked position.

8. The assembly of claim 7 further comprising a spring disposed within said hollow member for biasing each of said first pins to said first locked position.

9. The assembly of claim 1 wherein each said lower plate includes a raised ridge portion.

10. The assembly of claim 9 wherein the raised ridge portion is U-shaped.

11. The assembly of claim 9 wherein the raised ridge portion includes a top surface parallel to the lower plate.

12. The assembly of claim 1 wherein each said receiver further comprises a wall portion for holding the upper and lower plates apart vertically and laterally.

13. The assembly of claim 1 further comprising a second pin extending vertically upward from each said lower plate.

14. A wheel lift attachment of the type coupled to a towing vehicle for supporting the wheels of a vehicle to be lifted and towed by the towing vehicle, said assembly comprising:

a cross beam adapted to be coupled to the towing vehicle, said cross beam having a first end and a second end;

first and second receivers coupled to said respective first and second ends of said cross beam, said first and second receivers comprising an upper plate and a lower plate that are parallel, said lower plate being spaced vertically below and horizontally offset from said upper plate, first and second wheel support arms slidably received between said upper and lower plates of said respective first and second receivers, a first pin extending outwardly from each of said receivers and positioned vertically below said respective upper plate such that at least a majority of the first pin is below a plane formed by an upper surface of said respective lower plate for preventing said respective wheel support arm from vertically tilting away from said respective upper and lower plates, and a second pin extending vertically upwardly from each of said lower plates for engaging each of said respective wheel support arms to prevent sliding horizontal movement of said wheel support arms relative to said respective upper and lower plates.

15. The assembly of claim 14 wherein each said wheel support arm is vertically tiltable between a first position wherein said respective second pin engages said wheel support arm to prevent sliding horizontal movement of said wheel support arm relative to said respective upper and lower plates and a second position wherein said wheel support arm is free to slide relative to said respective upper and lower plates.

16. A wheel lift attachment of the type coupled to a towing vehicle for supporting the wheels of a vehicle to be lifted and towed by the towing vehicle, said assembly comprising:

a cross beam adapted to be coupled to the towing vehicle, said cross beam having a first end and a second end;

first and second receivers coupled to said respective first and second ends of said cross beam, said first and second receivers comprising an upper plate and a lower plate that are parallel, said lower plate being spaced vertically below and horizontally offset from said upper plate, each said upper plate and said lower plate having a sidewall member, first and second wheel support arms slidably received between said upper and lower plates of said respective first and second receivers, a first pin extending outwardly from each of said receivers and positioned vertically below said respective upper plate such that at least a majority of the first pin is below a plane formed by an upper surface of said respective lower plate for preventing said respective wheel support arm from vertically tilting away from said respective upper and lower plates, each said receiver having a wall portion for holding the respective upper and lower plates apart vertically and laterally, said sidewall members of respective upper and lower plates being configured so as to allow the wheel support arm to be placed in between them such that the wheel support arm is positioned against the wall portion of the receivers.

17. A wheel lift attachment assembly of the type coupled to a towing vehicle for supporting the wheels of a vehicle to be lifted and towed by the towing vehicle, said assembly comprising:

a cross beam adapted to be coupled to the towing vehicle, said cross beam having a first end and a second end;

first and second receivers coupled to said respective first and second ends of said cross beam, said first and second receivers each having an upper plate and a lower plate that are parallel, said lower plate being spaced vertically below and horizontally offset from said upper plate;

first and second wheel support arms slidably received between said upper and lower plates of said respective first and second receivers, said first and second wheel support arms each having a wheel cradle member extending from one end thereof for engaging the wheels of the vehicle to be towed so that the wheels of the vehicle to be towed are cradled between said cross beam and said wheel cradle members; and characterized by a first pin extending outwardly from each of said receivers and positioned vertically below said respective upper plate such that at least a majority of the first pin is below a plane formed by an upper surface of said respective lower plate for preventing said respective wheel support arm from vertically tilting away from said respective upper and lower plates.

18. The assembly of claim 17 wherein said first and second receivers are rotatably coupled to said respective first and second ends of said cross beam so that said support arms can rotate horizontally about said first and second ends of said cross beam.

19. The assembly of claim 17 wherein said first end of said cross beam includes a first wheel abutment telescopingly coupled to said cross beam and wherein said second end of said cross beam includes a second wheel abutment telescopingly coupled to said cross beam such that said first and second receivers are rotatably coupled respectively thereto.

20. The assembly of claim 19 wherein said first and second wheel abutments each include a hollow rectangular portion having a top and bottom side, a hollow triangular portion attached to said rectangular portion, an upper ledge extending outwardly from said top side of said rectangular portion, and a bottom ledge extending outwardly from said bottom side of said rectangular portion.

21. The assembly of claim 20 wherein each of said receivers include upper and lower sleeve supports extending therefrom, and wherein said upper sleeve support is positioned vertically above said lower sleeve support and parallel therewith.

22. The assembly of claim 21 wherein each of said receivers include a tubular sleeve having a predetermined length and attached to said upper and lower sleeve supports.

23. The assembly of claim 22 further characterized by a cylindrical dowel having a length greater than said predetermined length of said tubular sleeve, said dowel being fixed between said upper and bottom ledges and extending through said tubular sleeve.

24. The assembly of claim 23 wherein each said bottom ledge includes at least one aperture therein and each said lower sleeve support has a third pin extending therefrom for engagement within said aperture to prevent said receivers from rotating about said respective dowel.

25. The assembly of claim 17 wherein said first end of said cross beam includes a first wheel abutment coupled to said cross beam and wherein said second end of said cross beam includes a second wheel abutment coupled to said cross beam such that said first and second receivers are coupled respectively thereto; and wherein said wheel abutments each have an upper surface which define a plane P1 and a lower surface which define a plane P2 and each upper plate and each lower plate are positioned so that each said wheel support member is disposed between plane P1 and plane P2.

26. The assembly of claim 17 wherein said first end of said cross beam includes a first wheel abutment coupled to said cross beam and wherein said second end of said cross beam includes a second wheel abutment coupled to said cross beam such that said first and second receivers are coupled respectively thereto; and wherein said first and second wheel abutments each include a top and bottom side, an upper ledge extending outwardly from said top side, and a bottom ledge extending outwardly from said bottom side; and wherein said upper ledges each have a top surface that defines a plane P3 and said bottom ledges each have a bottom surface that defines a plane P4; and the cross beam lies between planes P3 and P4, and said each upper and lower plates are positioned between planes P3 and P4.

27. The assembly of claim 17 further comprising said first end of the cross beam including a first wheel abutment and said second end of the cross beam including a second wheel abutment, and a first wheel tire strap and a second wheel tire strap for strapping the wheels to the respective first and second wheel abutments and the respective first and second wheel cradle members, each having a first and second chain, the first chain being removably coupled to the respective wheel abutment and the second chain being removably coupled to the respective wheel cradle member.

28. The assembly of claim 27 further comprising hooks for removably coupling each first chain to the respective wheel abutments, said wheel cradle members each including an aperture, and wherein each said second chain has a T-bar at one end thereof which can be inserted within the respective wheel cradle member aperture to removably couple each respective wheel strap member to the respective wheel cradle members.

* * * * *